United States Patent
Friedrich et al.

(10) Patent No.: US 6,874,846 B2
(45) Date of Patent: Apr. 5, 2005

(54) GUIDE ARRANGEMENT FOR MOTOR VEHICLE SLIDING ROOFS

(75) Inventors: Norbert Friedrich, Wehrheim (DE); Rainer Hattass, Gründau (DE)

(73) Assignee: ArvinMeritor GmbH, Dietzenbach (DE)

(*) Notice: Subject to any disclaimer, the term of this patent is extended or adjusted under 35 U.S.C. 154(b) by 0 days.

(21) Appl. No.: 10/624,460

(22) Filed: Jul. 22, 2003

(65) Prior Publication Data

US 2004/0130187 A1 Jul. 8, 2004

(30) Foreign Application Priority Data

Jul. 23, 2002 (DE) .......................... 102 33 257

(51) Int. Cl.[7] .............................................. B60J 7/057
(52) U.S. Cl. .................... 296/216.08; 296/223
(58) Field of Search ............... 296/216.08, 223; 49/42

(56) References Cited

U.S. PATENT DOCUMENTS 4,923,245 A * 5/1990 Kuwabara .................. 296/214
5,344,209 A * 9/1994 Regner ...................... 296/223
6,024,404 A   2/2000 Stallfort et al.

FOREIGN PATENT DOCUMENTS

| DE | 31 35 741 A1 | 5/1982 | |
|---|---|---|---|
| DE | 3813049 | * 11/1989 | ............ 296/216.04 |
| DE | 197 14 432 C1 | 9/1998 | |
| DE | 100 46 129 A1 | 4/2002 | |
| EP | 1 070 614 A1 | 1/2001 | |
| EP | 1 145 887 A2 | 10/2001 | |
| JP | 11334378 | 12/1999 | |
| JP | 2000326731 | 11/2000 | |

* cited by examiner

*Primary Examiner*—Dennis H. Pedder
(74) *Attorney, Agent, or Firm*—Carlson, Gaskey & Olds

(57) ABSTRACT

A guide arrangement for linear sliding movements of guide shoes (10) along guide rails (3) for sliding roofs of motor vehicles includes slide elements (17, 20) at three spaced points, which coincide approximately with the vertices of an imaginary triangle. The slide elements are guided in sliding fashion along three associated slideways (16, 19) of the guide rail (3) with little play or, if the guide shoe (10) is resilient, even without play or rattling.

17 Claims, 3 Drawing Sheets

GUIDE ARRANGEMENT FOR MOTOR VEHICLE SLIDING ROOFS

CROSS-REFERENCE TO RELATED APPLICATIONS

This application claims priority to German Patent Application No. 102 33 257.6 filed Jul. 23, 2002.

BACKGROUND OF THE INVENTION

The invention relates to a guide arrangement for linear sliding movements of guide shoes along guide rails for sliding roofs.

For the purposes of this description, the term "sliding roofs" includes all designs in which at least one cover is associated in displaceable fashion with a roof opening of a motor vehicle and in this respect can slide by means of guide shoes along guide rails which are applied laterally along the roof opening. These include not just designs in which the cover can be slid under the rear fixed roof surface after lowering its rear edge in order to free the roof opening, but also so-called sliding-lifting roofs where the cover can additionally be pivoted from its position which closes the roof opening about a pivot axis provided in the vicinity of its front edge in order to be extended beyond the fixed roof surface. Finally, this definition is also intended to comprise designs in which, after lifting its rear edge, the cover can be displaced more or less to the rear beyond the rear fixed roof surface (so-called overhead sliding roofs, spoiler roofs). Also to be included are roof designs in which the cover, of which there is at least one, is not formed from sheet metal or glass, but instead as a collapsible roof of a flexible flat material.

Two front and two rear guide shoes are as a rule provided for sliding covers of sliding roofs, which shoes are in each case disposed in pairs. The front guide shoes guide the front end, mounted by means of a pivot bearing, of the cover. The elements for vertically displacing the cover and the drive elements effecting the sliding drive (e.g., flexible drive cables guided in bending-resistant fashion, with a threaded winding for the engagement of a drive pinion) are connected to the rear guide shoes.

The slide elements at the guide shoes are formed according to the prior art either as slide pieces which are guided in U-shaped guide grooves, which form the slideways (e.g., DE 197 27 738 C1), or as U-shaped sliders which are guided at guide webs, which form the slideways, of the guide rails. In both cases the slide pieces or sliders are disposed in opposite pairs at the guide shoes, have large-area slide pair surfaces and as a rule lie in one plane.

The slide elements should be guided in sliding fashion at the guide rails without rattling, yet with the lowest possible friction level. However, interference or loose fits occur in this case due to manufacturing tolerances. Interference fits result in high coefficients of friction and a high level of wear, while loose fits are seldom rattle-free. Even slight soiling of the slideways at the guide rails may increase these undesirable effects further.

SUMMARY OF THE INVENTION

The object of the invention is to provide a guide arrangement of the type initially mentioned which is greatly improved in terms of the coefficients of friction, tendency to rattle and risk of soiling.

The disclosed embodiment of this invention proposes three spatially separate slide element/slideway pairs by which each guide shoe is supported in three-point fashion at the guide rail, wherein significant support widths between the three support points are obtained on account of the vertical offset of the third slide element/slideway pair with respect to the two other slide element/slideway pairs. This formation does not tend to rattle, even with sufficient clearance of motion and thus low coefficients of friction.

The three slide element/slideway pairs in one example are preferably disposed at the guide shoe and the guide rail such that the three support points have the configuration of a triangle, with a base line extending between the two upper support points and a triangle vertex pointing downwards and marked by the third support point. One example includes a symmetrical arrangement of the three support points in the manner of an isosceles triangle.

One example renders the slideways and slide elements relatively narrow, so as to result in small contact surfaces at the slide element/slideway pairs, thereby reducing the risk of soiling significantly when compared with the conventional large-area contact surfaces. In disclosed embodiments, the small contact surfaces have smaller dimensions than spacing between the slide element/slideway pairs. In disclosed examples, two of the slide elements are spaced apart by a lateral distance and a third slide element has a contact surface with a lateral dimension that is less than the lateral distance between the other two slide elements.

The guide shoes are guided without tilting at the guide rails if the slide element/slideway pairs engage in concave/convex form-locking fashion, in two alternative formations. Corresponding results are obtained if the two upper slide element/slideway pairs are formed as in two other examples, wherein low-friction line contact is then even achieved at these two support points.

The slide elements may be molded integrally onto the guide shoes, thereby greatly simplifying the formation and manufacture of the guide shoes.

In an example where the guide shoes are formed as resilient elements, the slide elements are advantageously supported at the associated slideways with resilient contact pressure, so that there is practically no play.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
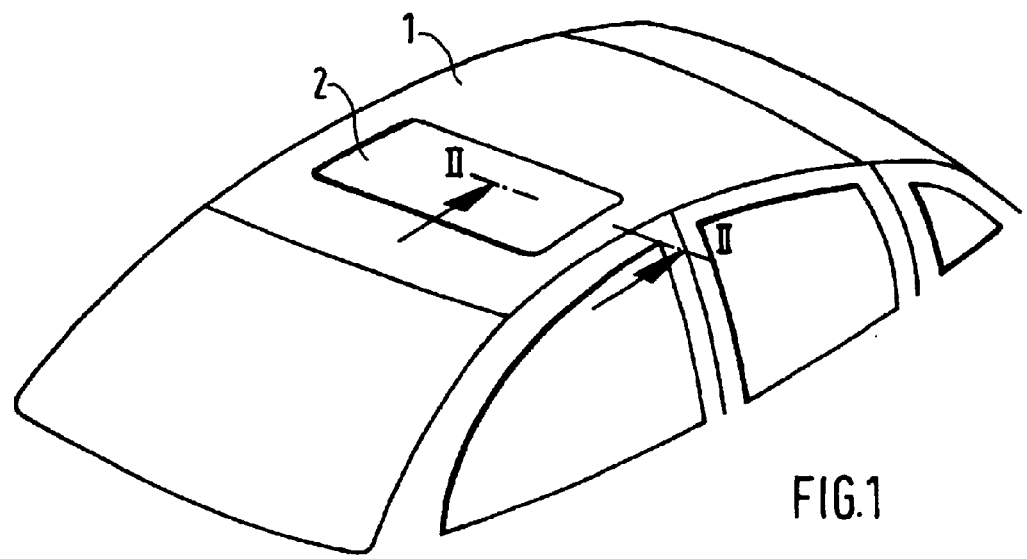
FIG. 1 is a perspective representation of the roof and window region of a passenger vehicle.
Figure 2:
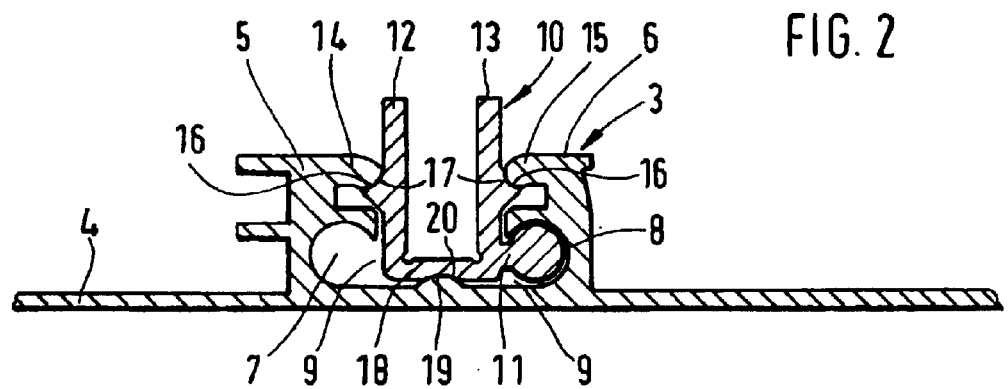
FIG. 2 is a truncated section along the intersection line II—II in FIG. 1, although without body parts, in a first embodiment of the guide arrangement.
Figure 3:
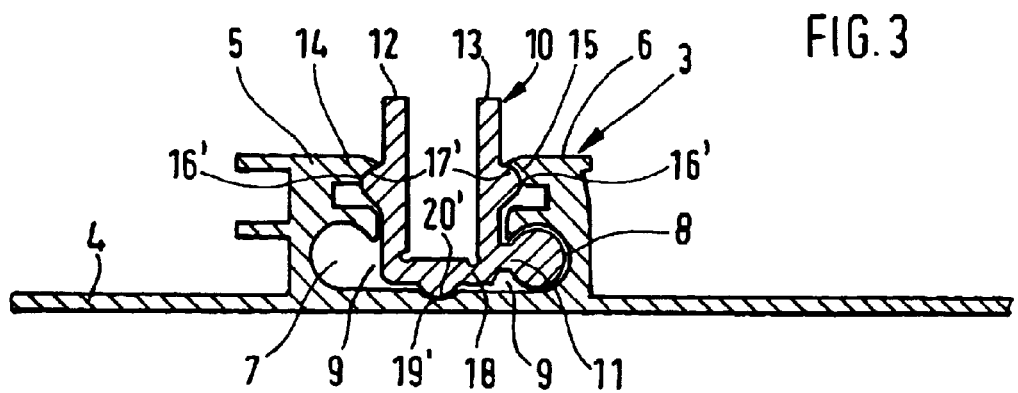
FIG. 3 is a section which is similar to FIG. 2, although in a second embodiment of the guide arrangement.

FIG. 1 represents a vehicle roof 1, fitted with a sliding roof and having a closed sliding cover 2. The sliding cover 2 is guided in sliding fashion via guide shoes, which are yet to be described in detail, at two lateral guide rails 3, of which only the guide rail 3 on the left-hand side, related to the forward direction of travel, is represented in FIGS. 2 and 3. The right-hand arrangement is approximately a mirror-inverted configuration.

In the two embodiments which are shown in FIGS. 2 and 3 the guide rail 3 is, for example, an integral component of a lateral guide frame part 4, which is not represented in detail. The guide rail 3 comprises two sectional ribs 5 and 6, which extend in parallel and at a spacing side-by-side and are directed upwards. The facing surfaces of the sectional ribs 5 and 6 are disposed parallel to one another. Cable guide ducts 7 and 8, which lie opposite one another at the bottom, are located in the sectional ribs 5 and 6. The cable guide ducts 7 and 8 have corresponding circular cross sections, which are open toward the guide rail center via slots 9. Two flexible drive cables (not represented), which are provided with threaded wire windings, are displaceably guided in compression-and tension-proof fashion in the cable guide ducts 7 and 8. These cables are driven in opposite directions in the manner of racks by a drive pinion (not represented) which is generally rotatably mounted in a front guide frame part (not represented). One of the drive cables is in each case connected to one of the two rear guide shoes 10, the left-hand one of which is represented in FIGS. 2 and 3, via a driver 11 reaching through the slot 9.

The guide shoe 10 which, together with the right-hand rear guide shoe, which is not represented, forms the sliding mechanism for the sliding cover 2. The example guide shoe 10 essentially has a U-shaped cross section which is open to the top and comprises side walls 12 and 13 which are directed upwards, are parallel to one another and essentially serve to hold extension elements, which are not represented, for the sliding cover 2. The two front guide shoes, which are not represented, are formed in a similar manner, although are without a driver 11. The front guide shoes hold pivot bearing parts, which are not represented, for the sliding cover 2. Corresponding comments also apply to the guides for the sliding water channel provided in the case of sliding roofs, this engaging under the rear edge gap (not represented) when the sliding cover is closed.

Webs 14 and 15, which are turned inwards toward one another and bent downwards, are provided at the sectional ribs 5 and 6 in both embodiments which are represented in FIGS. 2 and 3, these webs forming slideways with their ends. These are convexly curved slideways 16 in the case of FIG. 2 and concavely curved slideways 16' in the case of FIG. 3.

Slide elements, which are associated with the slideways 16, 16', are molded integrally onto the outside of the side walls 12 and 13 of the guide shoe 10. These are concavely curved slide elements 17 in the case of FIG. 2 and convexly cured slide elements 17' in the case of FIG. 3.

A third slideway is located at the bottom between the two sectional ribs 5, 6 of the guide rail 3. This is a rib-like convexly curved slideway 19 in the case of FIG. 2 and a groove-like concavely curved slideway 19' in the case of FIG. 3.

The two side walls 12 and 13 of the guide shoe 10 are integrally connected together via a connecting web 18 at the bottom. A third slide element is located at the underside of the connecting web 18. This is a groove-like concavely curved slide element 20 in the case of FIG. 2 and a rib-like convexly curved slide element 20' in the case of FIG. 3.

It is evident from the preceding description and the drawings that the guide shoes 10 in each case comprise three spaced slide elements 17, 20 and 17', 20', respectively, which are supported practically without play at three associated slideways 16, 19 and 16', 19', respectively, in both embodiments. In both embodiments there is contact between the guide rail 3 and the guide shoe 10 only at the described points of the three slide element/slideway pairs, apart from the contact between the driver 11 and the associated cable guide duct 8. It is also evident that the two upper slide element/slideway pairs are vertically offset with respect to the third, lower slide element/slideway pair in both embodiments. Here the two upper slide element/slideway pairs are located on different sides of the guide shoe 10 approximately at the same height as the guide shoe 10 and the guide rail 3. The lower third slide element/slideway pairs is located between the two sectional ribs 5 and 6 of the guide rail 3, preferably in a central position between the two sectional ribs 5 and 6, as shown in the drawings.

The drawings also illustrate how the slide elements 17, 17' and 20, 20', just as the slideways 16, 16' and 19, 19', are only of a slight width in relation to the length of the slide elements, which corresponds approximately to the length of the guide shoe 10. The drawings show an embodiment where the slide elements 17, 17' are spaced apart a lateral distance. The slide elements 20, 20' have a contact surface with lateral dimension that is less than lateral distance between the slide elements 17, 17'.

Figure 4:
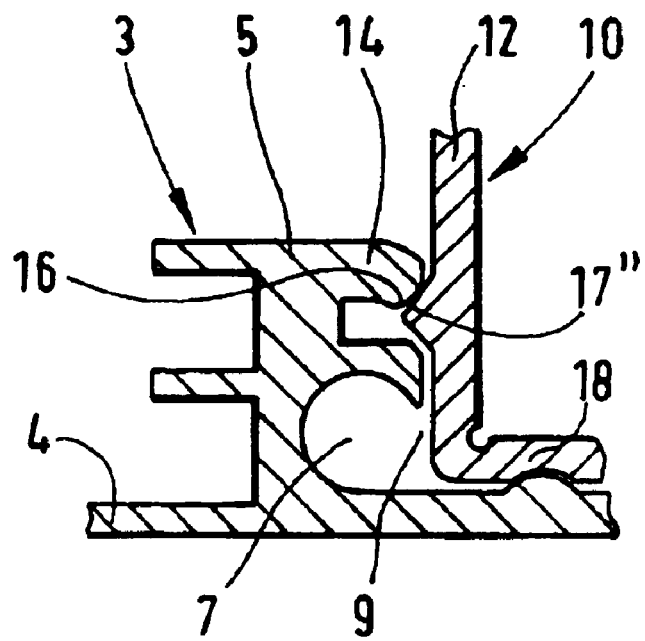
FIG. 4 is a truncated section which is represented scaled-up and which shows a variant of the first embodiment according to FIG. 2.
Figure 5:
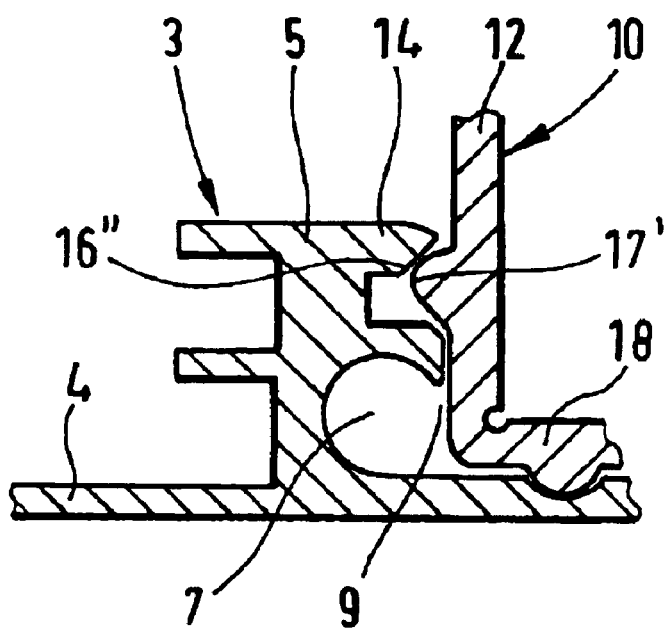
FIG. 5 is a truncated section which is represented scaled-up and which shows a variant of the second embodiment according to FIG. 3.

The guide arrangements which are represented in FIGS. 4 and 5 are variants of the arrangements which are shown in FIGS. 2 and 3, respectively. Both arrangement variants relate to the formation of the two upper slide element/slideway pairs. Whereas in FIG. 4 the slide elements 17" have a plane slide surface, in FIG. 5 the slideways 16" are formed as a plane surface. However, the slideway 16 in FIG. 4 and the slide element 17' in FIG. 5 are convexly curved, the result of which is favorable line contact in both variants.

Figure 2A:
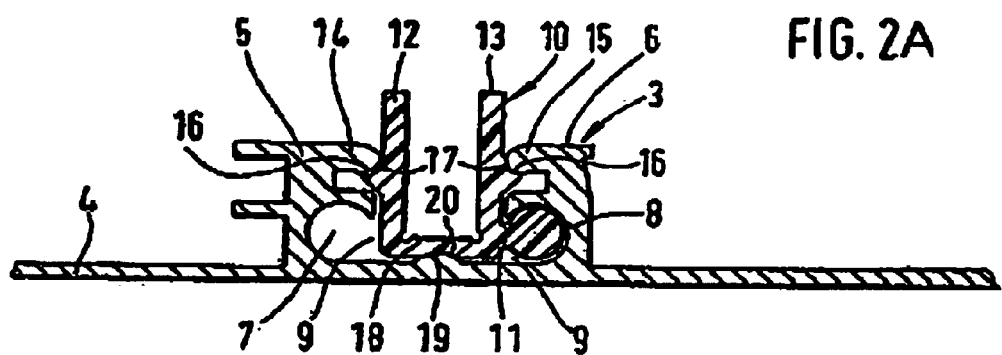
FIG. 2A shows a resilient material embodiment like the embodiment of FIG. 2.

The guide shoes 10 in some examples (FIG. 2A) are formed as resilient elements, so that the slide elements are pressed resiliently against the associated slideways.

Given a guide arrangement for linear sliding movements of guide shoes at guide rails for sliding roofs of motor vehicles, slide elements are provided at three spaced points, which coincide approximately with the vertices of an imaginary triangle, at each of the four guide shoes, which elements are guided in sliding fashion at three associated slideways of the pertaining guide rail with little play or, if the guide shoe is resilient, even without play or rattling.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A guide assembly for a sliding roof component, comprising:
    a guide rail; and
    a guide shoe at least partially received within the guide rail, the guide shoe having a plurality of slide elements that slide along correspondingly positioned slideways on the guide rail, two slide elements of the plurality of slide elements being located on opposite sides of the guide shoe and a third slide element being vertically offset and substantially centrally located relative to the two slide elements, the two slide elements being spaced apart by a lateral distance and the third slide element having a contact surface that contacts a corresponding slideway and has a lateral dimension that is less than the lateral distance.

2. The assembly of claim 1, wherein the two slide elements are located at approximately the same height near a top of the guide shoe, and the third slide element is located near a bottom of the guide shoe.

3. The assembly of claim 1, wherein the third slide element is centrally positioned relative to the two slide elements.

4. The assembly of claim 1, wherein at least one of the slide elements has a concavely curved shape and a corresponding slideway has a corresponding convexly curved shape.

5. The assembly of claim 1, wherein at least one of the slide elements has a convexly curved shape and a corresponding slideway has a correspondingly concavely curved shape.

6. The assembly of claim 1, wherein at least one of the slide elements has a planar slide surface and a corresponding one of the slideway has a convexly curved shape.

7. The assembly of claim 1, wherein at least one of the slide elements has a convexly curved shape and a corresponding one of the slideways has a planar slide surface.

8. The assembly of claim 1, wherein the slide elements are integrally molded as part of the guide shoe.

9. The assembly of claim 1, wherein the guide shoe and the slide elements are resilient and the slide elements are pressed resiliently against the corresponding slideways.

10. The assembly of claim 1, wherein the slide elements are arranged in a triangular orientation.

11. The assembly of claim 10, wherein each of the two and third slide elements is at a corner of the triangular configuration.

12. The assembly of claim 1, wherein each of the two slide elements contacts a corresponding slideway along a single line of contact.

13. The assembly of claim 1, wherein the third slide element has one of a concave and a convex shape.

14. The assembly of claim 13, wherein a slideway corresponding to the third slide element has a shape that is the other of the convex and concave shape.

15. A guide assembly for a sliding roof component, comprising:

a guide rail; and a guide shoe at least partially received within the guide rail, the guide shoe having a plurality of slide elements that slide along correspondingly positioned slideways on the guide rail, two slide elements of the plurality of slide elements being located on opposite side of the guide shoe and a third slide element being vertically offset relative to the two slide elements, wherein at least one of the slide elements has a concavely curved shape and a corresponding slideway has a correspondingly convexly curved shape.

16. A guide assembly for a sliding roof component, comprising:

a guide rail; and a guide shoe at least partially received within the guide rail, the guide shoe having a plurality of slide elements that slide along correspondingly positioned slideways on the guide rail, two slide elements of the plurality of slide elements being located on opposite sides of the guide shoe and a third slide element being vertically offset relative to the two slide elements, wherein at least one of the slide elements has a planar slide surface and a corresponding one of the slideways has a convexly curved shape.

17. A guide assembly for a sliding roof component, comprising:

a guide rail; and a guide shoe at least partially received within the guide rail, the guide shoe having a plurality of slide elements that slide along correspondingly positioned slideways on the guide rail, two slide elements of the plurality of slide elements being located on opposite sides of the guide shoe and a third slide element being vertically offset relative to the two slide elements, wherein at least one of the slide elements has a convexly curved shape and a corresponding one of the slideways has a planar slide surface.

* * * * *